(12) United States Patent
Wani et al.

(10) Patent No.: US 7,396,500 B2
(45) Date of Patent: Jul. 8, 2008

(54) MOLDED PARTS WITH METAL OR WOOD SURFACE AREAS AND PROCESSES FOR THEIR PRODUCTION

(75) Inventors: Vijay Wani, Midland, MI (US); Michael E. Hus, Midland, MI (US); Eric Marchbanks, Linwood, MI (US); Curt E. Peterson, Midland, MI (US); Thomas Van Conett, Saginaw, MI (US)

(73) Assignee: Dow Technologies Inc., Midland, MI (US)

( * ) Notice: Subject to any disclaimer, the term of this patent is extended or adjusted under 35 U.S.C. 154(b) by 27 days.

(21) Appl. No.: 10/767,011

(22) Filed: Jan. 29, 2004

(65) Prior Publication Data

US 2004/0209032 A1 Oct. 21, 2004

Related U.S. Application Data

(63) Continuation-in-part of application No. 10/208,617, filed on Jul. 29, 2002, now Pat. No. 6,926,856.

(51) Int. Cl.
*B29C 45/14* (2006.01)
*B29C 45/16* (2006.01)

(52) U.S. Cl. .................................. 264/255; 264/328.8

(58) Field of Classification Search .................. 264/255
See application file for complete search history.

(56) References Cited

U.S. PATENT DOCUMENTS 4,137,366 A * 1/1979 Harada et al. ............... 428/157
4,868,021 A 9/1989 Zoller
5,034,173 A * 7/1991 Altman et al. ............... 264/102
5,444,183 A 8/1995 Gehrs et al.
5,635,220 A * 6/1997 Izumi et al. .................. 425/116
5,715,966 A 2/1998 Nagano et al.
5,837,086 A 11/1998 Leeb et al.

(Continued)

FOREIGN PATENT DOCUMENTS

DE 3733287 A 4/1989

(Continued)

OTHER PUBLICATIONS

Umspritzen Schafft Den Durchbruch, Kunststoffberater (Plastic Advisor), Oct. 1999 by Knoblauch et al., vol. 40, pp. 40-41 (English translation provided).

*Primary Examiner*—Monica A Huson

(57) ABSTRACT

The present invention thus provides a plastic part with a surface area of a semi-rigid sheet material such as metal, wood or wood-based paper product and a novel process where the sheet material edges are covered with a second plastic component that adheres both to the sheet material and to the first plastic material. A first plastic substrate component is prepared with an adhered sheet material surface area and then the edges of the sheet material are overlapped by a second molded-on, plastic edge-covering component. A preferred sheet material laminate structure is also provided with a backing layer that protects an interior adhesive layer. The second molded-on edge-covering component covers the sheet material edge to provide an aesthetically pleasing surface. This construction produces a more durable sheet material edge covering and eliminates the tendency of the sheet material to peel off the molded part during use.

15 Claims, 4 Drawing Sheets

U.S. PATENT DOCUMENTS

| | | |
|---|---|---|
| 6,132,834 A * | 10/2000 | Ackeret et al. ............... 428/67 |
| 6,165,404 A * | 12/2000 | Savonuzzi ................ 264/266 |
| 6,447,706 B1 | 9/2002 | Savonuzzi |
| 6,753,057 B1 * | 6/2004 | Gardner, Jr. ................ 428/43 |
| 2002/0031620 A1 | 3/2002 | Yuzawa et al. |
| 2002/0171169 A1 | 11/2002 | Chao-Yueh |
| 2004/0018337 A1 | 1/2004 | Hus et al. |
| 2004/0209032 A1 | 10/2004 | Wanl et al. |

FOREIGN PATENT DOCUMENTS

| | | |
|---|---|---|
| DE | 4120133 A | 12/1992 |
| DE | 42 28 283 | 3/1994 |
| DE | 4228283 A | 3/1994 |
| EP | 475 198 | 3/1992 |
| EP | 517 615 | 12/1992 |
| EP | 629 481 | 12/1994 |
| EP | 0936044 | 8/1999 |
| EP | 1 132 189 | 12/2001 |
| JP | 59209115 A | 11/1984 |
| JP | 63067131 | 3/1988 |
| JP | 083300380 | 11/1996 |
| NL | 6701661 A | 10/1967 |
| WO | 9609160 A | 3/1996 |

* cited by examiner

MOLDED PARTS WITH METAL OR WOOD SURFACE AREAS AND PROCESSES FOR THEIR PRODUCTION

This application is a Continuation-in-part (CIP) of prior application Ser. No.: 10/208,617 filed Jul. 29, 2002 now U.S. Pat. No. 6,926,856.

This invention relates to injection molded plastic parts having a plastic substrate and a surface area of a sheet material which can be a metal foil, wood veneer or similar semi-rigid sheet material. This invention is also a process for making these parts where the sheet material is uniformly conformed and adhered to the plastic substrate and the edges are secured in a very effective and aesthetically pleasing manner. Parts are produced with good appearance, precise dimensions, thin part cross section and stable, secure edge coverings.

BACKGROUND OF THE INVENTION

There are a number of processes for providing a surface layer or surface insert of a metal, wood or paper, onto the surface of molded plastic parts using an injection molding process and pre-inserting or feeding a metal and/or wood surface piece in front of or into the mold. In U.S. Pat. No. 5,837,086 a metal foil layer is provided in an injection molded article. The metal foil is in a laminate with layers of plastic on either side. The laminate is placed in an injection mold and molten plastic forced against the plastic laminate surface.

EP 1,132,189 describes the application of a metallic foil surface layer to an injection molded plastic substrate in a process which conforms the metal surface layer to the mold and folds the metal edges back over the plastic edges to conceal the substrate and provide mechanical connection of the metal to the substrate. An adhesive layer may be applied between the foil and the substrate to assist in forming a secure connection.

DE 42 28 283 describes the use of insert molded plastic to cover the edges of a decorative layer of fabric or plastic film.

SUMMARY OF THE INVENTION

The present invention overcomes several disadvantages and/or problems in prior art articles and processes providing improved injection molded articles with an attractive, uniformly well adhered, and durable surface area of wood, metal or other semi-rigid sheet material.

These molded articles have desired combinations of thin dimensions, electromagnetic shielding function, aesthetics and/or durability with the true feel of real metal or wood.

According to the present invention, improved parts are provided where a molded plastic article having a plastic substrate component with an adhered surface area of a semi-rigid sheet material selected from the group of metal, wood or wood-based paper products and where at least part of the sheet material edges and sheet material surface area adjacent the edges are overlapped by a molded-on, plastic edge-covering component. Preferably the surface area is provided by a thin metal sheet or foil or a thin wood sheet or veneer. In one embodiment the sheet material is a laminate structure comprising the sheet material, an interior adhesive layer and, on the surface opposite the sheet material layer, a protective backing layer which bonds or otherwise adheres to the substrate plastic and preferably the adhesive layer is a polyamide adhesive. Preferably the molded plastic article according to invention have a molded-on, continuous plastic substrate component that also provides protective edge thickness covering for at least a part of the thickness of the sheet material.

In another embodiment, the present invention is a process for preparing a molded plastic article having a sheet material surface piece comprising the steps of: (a) providing a precut sheet material surface piece to a mold cavity (b) molding in a first molding step a substrate plastic component having the adhered sheet material piece having edges and a surface area; (c) molding on in a second molding step an edge-covering component which overlaps at least part of the sheet material edges and sheet material surface area adjacent the edges but not an area intended to be at the article surface. Preferably the precut sheet material surface piece is adhered in the first molding step to a continuous plastic substrate and provided with an edge thickness covering that will cover at least a part of the thicknesses of the peripheral edges of the sheet material. Preferably the sheet material used in this process is a laminate structure comprising the sheet material, an interior adhesive layer and, on the surface opposite the sheet material layer, a protective backing layer which bonds or otherwise adheres to the substrate plastic and protects the adhesive layer during the molding step In a preferred process according the invention the molded-on edge-covering component is provided directly to the substrate plastic component with adhered sheet material that results from the first molding step without intermediate trimming, cutting or tooling. It has also been found advantageous to perform the second molding step with a mold design that provides a flow leader effect with (a) a main flow leader cavity for the edge-covering plastic component material which main flow cavity is generally around and outside the area of the peripheral sheet material edges and (b) a sheet material edge cavity that receives a flow of the edge-covering material in a direction that is generally not parallel to the peripheral edges of the sheet material.

In another embodiment, the present invention is a process for preparing a molded plastic article having a sheet material surface piece comprising the steps of: (a) providing a precut sheet material surface piece to a mold cavity and (b) in a molding step, molding onto the sheet material a substrate plastic component; wherein the sheet material is a laminate structure comprising a front, surface-facing layer of a thin, semi-rigid sheet material selected from the group of: metal, wood or wood-based paper products, an interior adhesive layer and, on the surface opposite the sheet material layer, a protective backing layer which bonds or otherwise adheres to the substrate plastic and protects the adhesive layer during the molding step. Preferably the adhesive layer is a polyamide adhesive and preferably the outer protective backing layer material is the same as or bonds with the substrate plastic.

DETAILED DESCRIPTION

Figure 1:
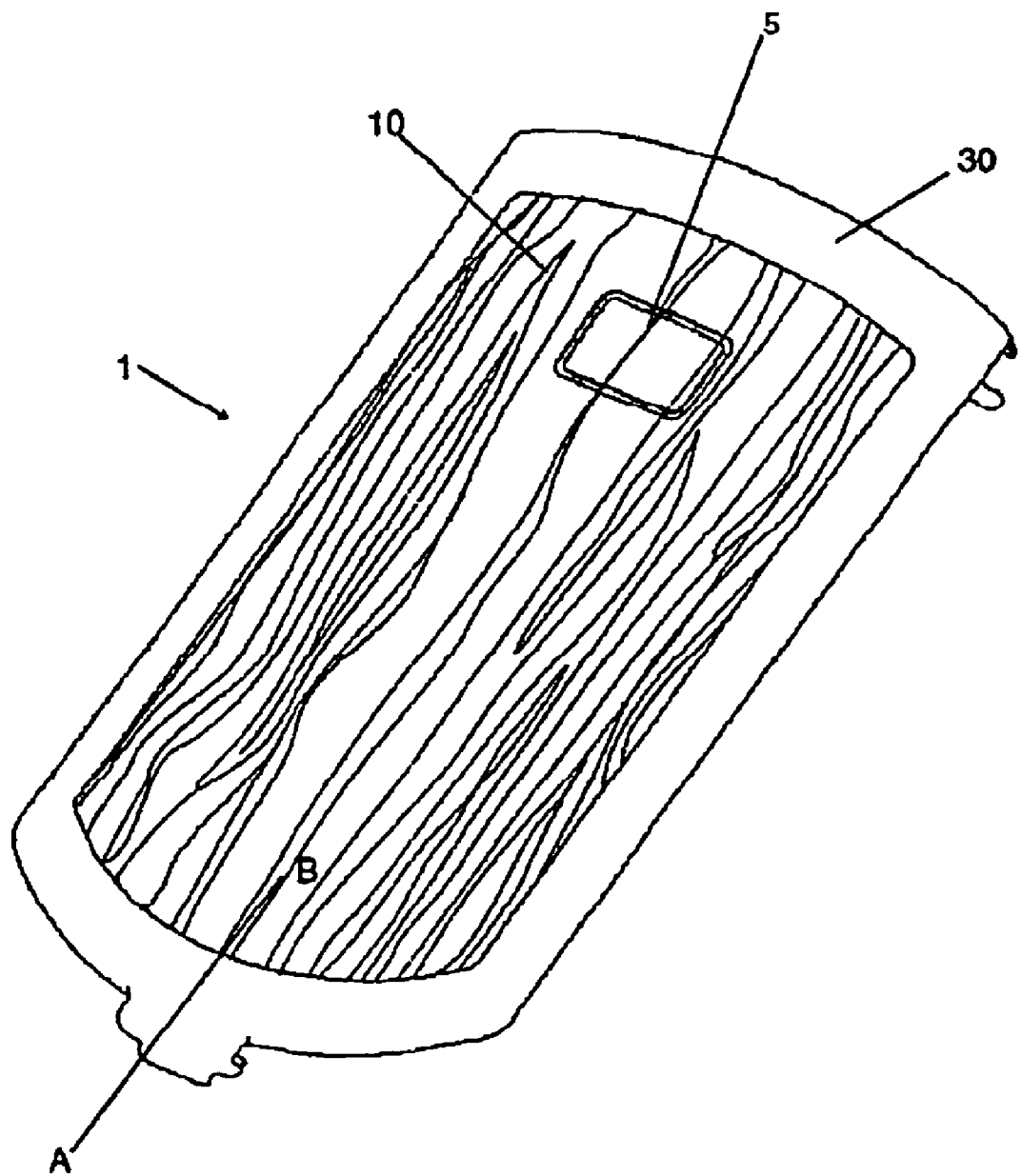
FIG. 1 is a perspective view of the front side of a sample part prepared according to the invention.

This invention provides improved injection molded articles with an attractive and durable surface area of a sheet material which can be wood, metal or other semi-rigid sheet material not including fabrics or plastic films. While sheet materials such as metal and wood provide desired aesthetics and durability, they are not readily useable in an injection molding process for preparing thin and attractive plastic parts due to their greater thickness, rigidity, and difficulty to uniformly conform and adhere to the plastic substrate part and cover and secure at the edge areas. Decorative metallic surface effect via post molding processes such as electrostatic deposition, vacuum deposition, plasma vapor deposition are known but such surface finishes are inferior to the extent that they do not impart a true metallic feel to a coated product nor they particularly resistant to wear. Similarly, decals or other wood or metal appearance effects can be provided but also lack the true feel of the true, natural material. Surprisingly, according to the present invention, more rigid sheet materials which can be thin metal sheet or wood veneer or similar semi-rigid sheet material are used to provide surface areas on injection molded parts that are uniformly bonded to the underlying plastic substrate with securely fastened edges.

A range of semi-rigid sheet materials can be used for the surface area according to this invention. This includes thin sheets or foils of various metals, thin veneers or sheets of wood or other similar rigid wood-based material such as paper, paperboard or converted paper products.

For example, the metal foil can be aluminum, copper, steel, stainless steel, zinc, magnesium, bronze, brass, titanium, gold, silver or other precious metals, including alloys of these, coated, plated or otherwise treated metal foils or sheets including Ni-coated steel, copper-plated steel, chrome-plated steel, tin-plated steel, and galvanized steel. In general, the suitable metals and metal alloys chosen have elastic modulus values ranging from 30 giga Pascals (Gpa) to 250 Gpa, densities ranging from 1.5 gram per cubic centimeter (gm/cc) to 22 gm/cc and Brinell Hardness numbers (HB) ranging from 15 to 500 kilograms per square millimeter ($kg/mm^2$). Preferably the sheet material is an aluminum alloy based on its combination of good forming properties and diversity of appearances and appearance treatments.

Wood-based materials include paper, paperboard or converted paper products including but not limited to 1.) cellulose wadding and webs of cellulose fibers, coated, impregnated, covered, surface colored, surface-decorated or printed, in rolls or sheet, 2.) Multi-ply paper & paperboard, tracing papers & glassine and other glazed transparent or translucent papers, composite paper and paperboard, paper coated with kaolin or with other inorganic substances. 3.) corrugated paper and paperboard.

Wood includes veneer sheets which can be one or more layer and can include layers of different natural wood types provided the thickness does not exceed about 6 mm. The general types of wood that can be used include the many known varieties of natural woods that can be provided in the form of a thin sheet or veneer including cork, damoburl, white sycamore, mahogany, makore, rosewood, teak, padauk, ebony, birdseye maple, anigre, southern silky oak, bamboo, walnut, birch, spruce, silver heart, curly maple, hard maple and beech. Preferred wood sheet materials include veneers of natural woods that have been treated and/or backed to make them more flexible and splinter-resistant and thus suited for use in a process of this type. Preferred wood sheet materials include resin impregnated woods, such as the veneer product of this type commercially available under the tradename Tennage, where the resin makes the wood more soft and flexible for processing while the wood maintains the natural wood texture and smell and has improved crack resistance, durability, water resistance and UV resistance. In general, the densities of suitable woods (unseasoned) range from about 0.10 gm/cc to about 1.5 gm/cc. The values for modulus of rupture (static bending) range from about 0.0150 Gpa to about 0.500 Gpa and the values for flexural modulus (static bending) range from about 3 Gpa to about 30 Gpa.

Compared to fabrics such as leather or to plastic foils that have been utilized for surface areas or decorative purposes in injection molded parts, the surface materials used according to the present invention are generally more rigid (higher modulus), non-uniform, difficult to uniformly conform and adhere to the plastic substrate part and/or difficult to cover and secure at the edge areas.

In general, these semi-rigid sheet materials range in thickness from about 0.01 mm to about 6.0 mm. Preferably, to provide most efficient use of the materials and minimize part thickness the thickness of materials is less than 2.0 mm, more preferably less than 1.0 mm, more preferably less than 0.5 mm and most preferably less than 0.3 mm. In order to provide sufficient strength for handling and durability, the thickness of the selected sheet material should be at least 2.0 mm, preferably at least 1.0 mm, more preferably at least 0.1 mm and most preferably at least 0.01 mm.

Depending upon the amount of shaping, conforming or embossing that is needed to be done in the injection molding step, the preferred semi-rigid sheet materials, at the desired sheet or layer thickness, can be deformed further when plastic melt is injected into the mold. In this way, it is possible to impart certain complicated and/or detailed shapes and/or relief to the semi-rigid sheet materials, such as embossing and sharp angles.

In the injection molding process where these sheet materials are used, it is important to achieve a strong and uniform bond between the back of the sheet material and the plastic substrate which is injection molded against the sheet material. If this bonding and adhesion is insufficient, the surface layer of sheet material will typically have visible bubbles or discontinuities and become noticeably delaminated from the plastic substrate. In many cases this will require an intermediate adhesive layer that is applied to the back of the sheet material prior to the injection molding step. The adhesive should be selected in terms of chemical nature and heat resistance to provide sufficient adhesion between the two materials and remain uniformly affixed and located across the entire surface area of the sheet material during the injection molding step. Examples of suitable adhesives include these generic types of adhesive compounds:

1.) Reactive pre-polymer adhesive: Low to medium molecular weight prepolymers are used as adhesive materials. These adhesives are available in either one or two component systems. Upon cure, the prepolymers produce a chemically cross-linked thermosetting polymeric adhesive. Example: epoxy adhesives, polyurethane adhesives, silicone adhesives.

2.) Hot polymer melt adhesive: Many thermoplastic materials can be used as adhesives in their bulk/film form. The polymers are heated enough to wet the surfaces to be bonded, and re-solidify upon cooling. Polyolefin types are mainly mixtures of copolyolefins containing EVAs, acrylics and other polar groups as adhesion promoters, but they can also be mixed with resins and other components. Copolyamides, copolyester, thermoplastic polyurethanes are other kinds of hot polymer melt adhesives.

3.) Reactive monomers: Low molecular weight monomers having solvent like consistency are used as adhesives. The polymerization is initiated by light, heat and a lack of oxygen. Acrylics and cyanoacrylates are monomeric adhesive systems.

Adhesive films can be used which consist of one or more layers. If multilayered, coextruded films or films laminated by other known techniques can be employed with a combination of layers and selected surfaces to provide adhesion specifically for the sheet material (such as metal) on one side and for the plastic substrate or backing film (such as ABS) on the other side.

It has been found, however, that when most adhesives for bonding metal or wood to plastics are applied to the metal/wood and then directly exposed to high temperature, shear and pressure of injection molded plastic melt, they become ineffective to bond those materials uniformly to the plastic in an injection molding process due to either thermal degradation of adhesive, displacement of adhesive from surface by the high pressure flow of injected plastic, or due to the premature thermosetting of cross-linking adhesives prior to contact of the metal/wood to the plastic substrate. It has been found that the sheet material can be used with a broader range of adhesives if the sheet material, adhesive and a protective backing material (discussed further below) are initially bonded together eliminating direct exposure of adhesive to injection molded plastic melt.

In another aspect of the present invention, when the sheet material has an adhesive layer, a "backing" or protective film of some type can advantageously be used to protect the adhesive during any handling or transporting steps, to prevent otherwise tacky adhesives from sticking to anything undesired prior to injection molding step and to protect the layer of adhesive and any heat sensitive sheet materials during the injection molding step from temperature and shear forces from the flow of the molten injected plastic. Thermoplastic backing can be film or sheet of plastic such as PC, PET, ABS, PBT, PA66, PP, HIPS and blends of any two of these materials. The criteria for selection of an appropriate backing include the protection needed by the adhesive against the shear force and heat of the injection molded substrate as well as its compatibility and/or bonding to the injection molded substrate.

Application of the adhesive and the backing material to the sheet material are done prior to the injection molding and can be done sequentially or concurrently. If sequentially, the adhesive layer can be provided/applied by a sprayed-on layer, a laminated film or similar known coating or application techniques followed by application of the backing in the same fashion and under appropriate heating conditions. Preferably, the adhesive and backing layers are applied to the sheet material concurrently, preferably as film materials, and bonded together by use of appropriate heat and pressure conditions. Heating steps could include flame lamination, electromagnetic radiation bonding, or hot roll lamination, flat bed lamination or the like.

As may be needed for facilitating fabrication of the part, the sheet material surface piece with adhesive and backing can be cut, stamped out, shaped, formed and/or preformed by known techniques such as the known deep drawing processes for preparing pre-formed shapes to be inserted into the mold. Depending upon the design of the finished article, there can obviously be different sheet material types used in different surface sections of the article.

Figure 2:
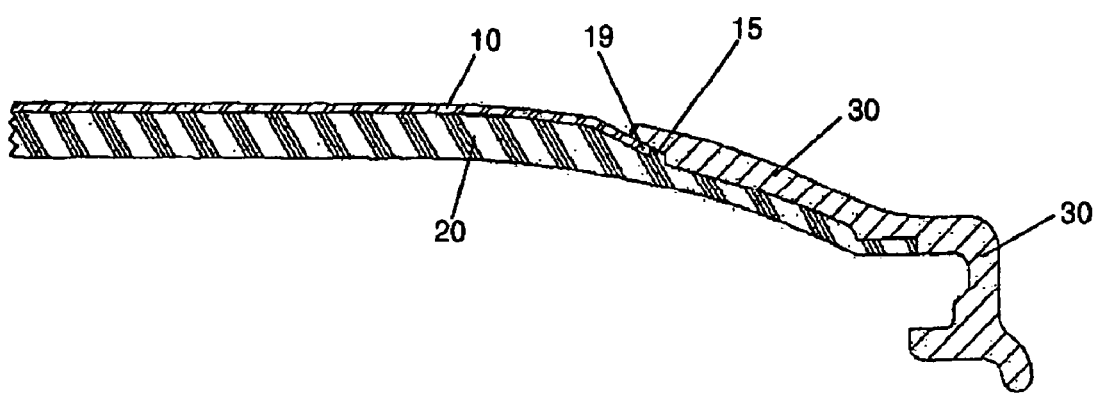
FIG. 2 is a cross sectional view of a sample part prepared according to the invention taken across the line A-B in FIG. 1.

The articles and process of the present invention can be better understood by reference to the attached Figures. FIG. 1 shows a sample part prepared according to the invention (1) including an area of wood veneer surface (10) and an embossed logo (5) that is provided in the wood veneer by the mold in the molding process and a second molded-on, edge-covering component (30). FIG. 2 is a cross sectional view of taken at line AB that shows the wood veneer sheet material surface piece (10) with peripheral edge areas (19) at the outer edges of the sheet material surface piece that are covered by the molded-on edge covering. Also shown in FIG. 2 is the first or substrate plastic component (20) and the second molded-on, edge-covering component (30).

Figure 3:
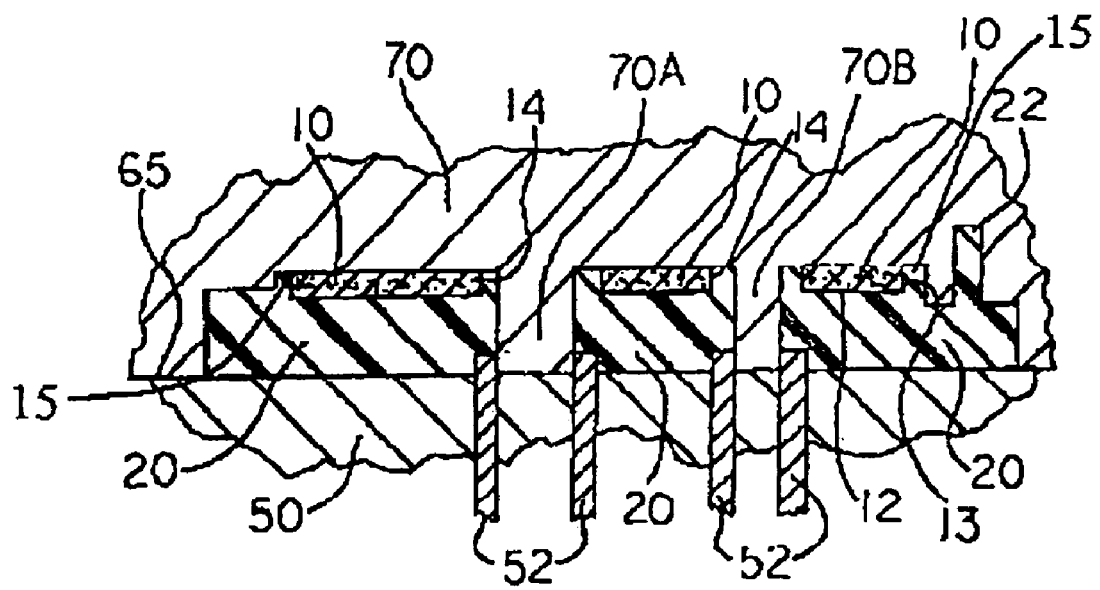
FIG. 3 is a cross sectional view of the first component molding step.

FIG. 3 is a cross sectional view of a first molding step and forming of the first substrate component according to the invention in a part that will also have interior openings that pass through the plastic part and are similarly provided with molded-on edge-covering components. In this figure, first mold part (50), which can be referred to as the "core", has the second mold part (70), which can be referred to as the first "cavity", closed against it. This creates an interface parting line (65). The sheet material surface piece (10) was placed in the mold and the first component plastic material (20) has been injected. As can be seen there are going to be two voids or openings in this area of the finished plastic part (and in the corresponding locations in the sheet material piece), the openings corresponding to and being formed by areas 70A and 70B of the second mold part. The precut sheet material piece (10) is initially located in the second mold part and the sheet material surface that will be on the finished part surface is held against the inside of the mold, for example by a piece of adhesive tape or vacuum source (not shown).

It is helpful in obtaining good surface properties of the sheet material and for the success of the subsequent edge-covering molding step that the precut sheet material be cut slightly smaller than the face of the cavity surface on which is located. In other words, the edges of the precut sheet material do not extend to the side or edge walls of the cavity but instead leave a small gap that is then filled with molten, injected plastic that will form the substrate. When this gap is filled in, it will form a protective edge thickness covering shown as (15) in FIGS. 2, 3, 4 and 5. This injected plastic from the first step will then preferably cover at least a part of the thicknesses of the peripheral edges (13) of the sheet material. This gap is preferably in the range of from about 0.3 to about 2 millimeters (mm), preferably about 0.75 mm.

The molten plastic material for the substrate or first component (20) is injected into the mold through an injection gate (not shown) at a rate and pressure sufficient to fill the mold, completely cover the sheet material piece, compress the sheet material piece against the mold surface and adhere the plastic to the back side of the sheet material piece (12). The injected plastic material will also generally cover the compressed thicknesses of the peripheral edges of the sheet material (13) and the interior edges of the sheet material (14) at the openings or voids.

Figure 4:
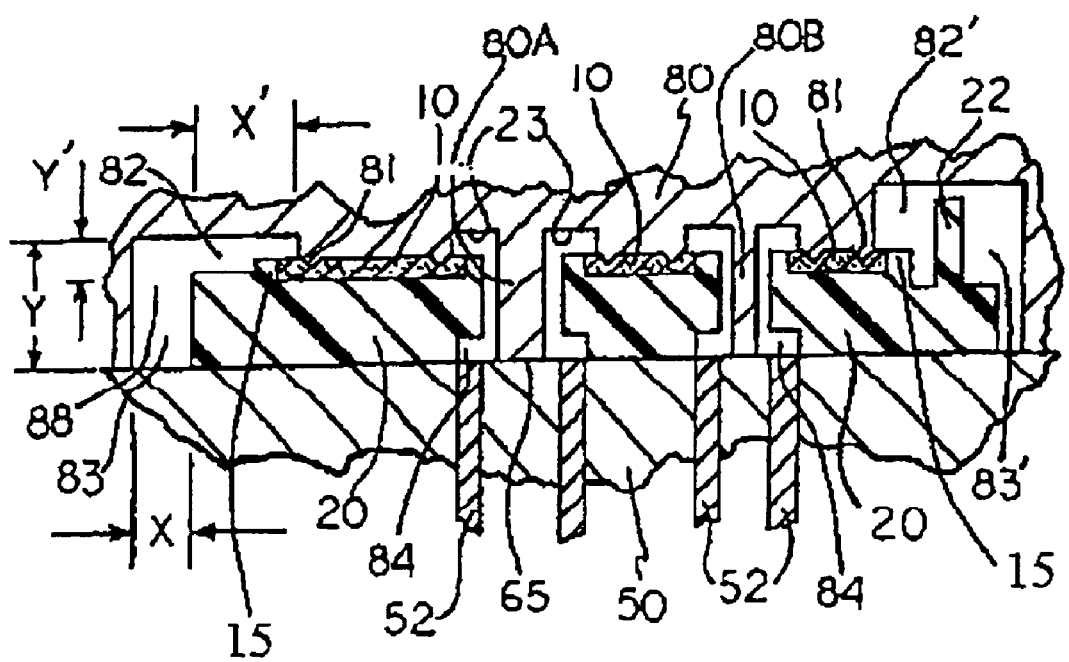
FIG. 4 is a cross sectional view of the second component mold.

In FIGS. 3 and 4 the use of a molded-in flow restrictor (22) is also shown, for example purposes, only on one side of the part. As discussed below, the use of a flow restrictor is one method that can be used to facilitate the proper flow of the second component plastic material over the sheet material peripheral edges (13) when the edge-covering component is added. Optional "core back" mold sections (52) are shown projected in FIG. 3 during first component molding step (and retracted in FIG. 4 for second component molding). In a preferred embodiment of the present invention, when these sections are then retracted prior to the second molding step, there are molded-in flow channels located in the back side of the first substrate material that can then provide space for the plastic material to flow and conduct the molten second, edge-covering material from the injection gate. As discussed further below, this technique of using molded-in flow channels makes it easier to provide molded-on edge-covering components at multiple interior sheet material edges (14) with out actually removing the intermediate molded piece from the first mold part ("core"). This is also a very advantageous mold and part design to use in combination with properly located "impingement" surfaces for the second molding step according to another preferred embodiment of the present invention. These flow channels provide a flow of second component plastic that comes generally from behind the substrate and then can be directed to hit "impingement" surfaces on the mold that are generally opposite the sheet material surface and edge. These impingement surfaces are then a preferred technique to direct the plastic flow onto the sheet material edge from a direction that is generally perpendicular to the sheet material surface (as opposed to a generally parallel flow) as will be discussed further below.

FIG. 4 is a cross sectional view of the mold configuration prior to a second molding step and prior to forming of the second substrate component according to the invention. In this figure the second mold part has been removed and replaced by a third mold part (80) (which can be referred to as the "second cavity") which is similarly closed against the first mold part (50) creating an interface parting line (65). As can be seen, the first component with sheet material surface area has remained located on the first mold part. As can be seen areas 80A and 80B of the third mold part will form the two openings in the finished plastic part. The "core backs" (52) have been retracted back into the core mold part to form flow channels (84) for the second molding material. There are typically further molded-in flow channels (shown in FIG. 6 and discussed further below) that connect the main injection point(s) to interior sheet material edge locations and the molded-in flow channels (84) that are shown in this figure that provide a material flow around the openings and to the interior sheet material edges.

As can be seen on the left side of the molding configuration shown in FIG. 4 and discussed further below, for the second, edge-covering component, a part/mold design preferably used according to the present invention uses a non-uniform thickness for the open cavity (88) which results in a non-uniform thickness of the resulting part wall. This is done to provide a larger cross-sectional flow area (shown as 83 with dimensions X and Y) as a "flow leader" and a smaller sheet material edge cavity section (shown as 82 with dimensions X' and Y'). In this way the injected molten plastic initially flows generally circumferentially around the perimeter of the sheet material piece but removed from the peripheral sheet material edge/interface to fill a large portion of the cavity volume. It was found that the cross-sectional area of the of the flow leader (X times Y) needs to be at least 10% greater than that of the cavity area at and over the sheet material edge cavity (X' times Y') in order to obtain these benefits and reduce sheet material "stripping" as will be discussed further below.

In FIG. 4 a "flow restrictor" (22) is also shown molded into the first component, for illustration purposes, molded only on the right side. Flow restrictors can be used to further narrow and restrict the flow path of the molten resin as it goes to the area of the sheet material peripheral edges. As discussed further below, a "flow restrictor" creates a flow leader effect and guides the second molding material initially along the channel (83') and then over the restriction, into the edge cavity area (82') and onto the top of the sheet material in a more perpendicular direction relative to the plane of the sheet material surface. The height of the flow restrictor relative to the sheet material in the sheet material edge cavity needs to be sufficient that the sheet material is protected from the flow and shear as the main body of molten plastic flows in the flow leader or main flow channel area of the cavity (83') in a generally parallel direction. In this way the plastic flow forces in the sheet material edge cavity (82' in FIG. 4) will not separate or delaminate the sheet material from the substrate and/or internally delaminate the sheet material itself.

The mold shown in FIG. 4 is also configured to provide plastic flow onto interior sheet material edge areas around the openings from molded-in flow channels (84) on the back of the first component in a generally perpendicular direction off of an impingement surface (23). The mold part (80) is also designed to conform and fit tightly against the sheet material surface area and/or is preferably provided with "crush ribs" (81) between the second component cavity area and sheet material surface area to prevent any of the second molding material from "flashing" outside of the intended cavity area and forming a layer or piece that lies between the sheet material and the second cavity (on the sheet material surface of the finished part) and creating a surface flaw on the sheet material surface when the part is removed from the mold.

Figure 5:
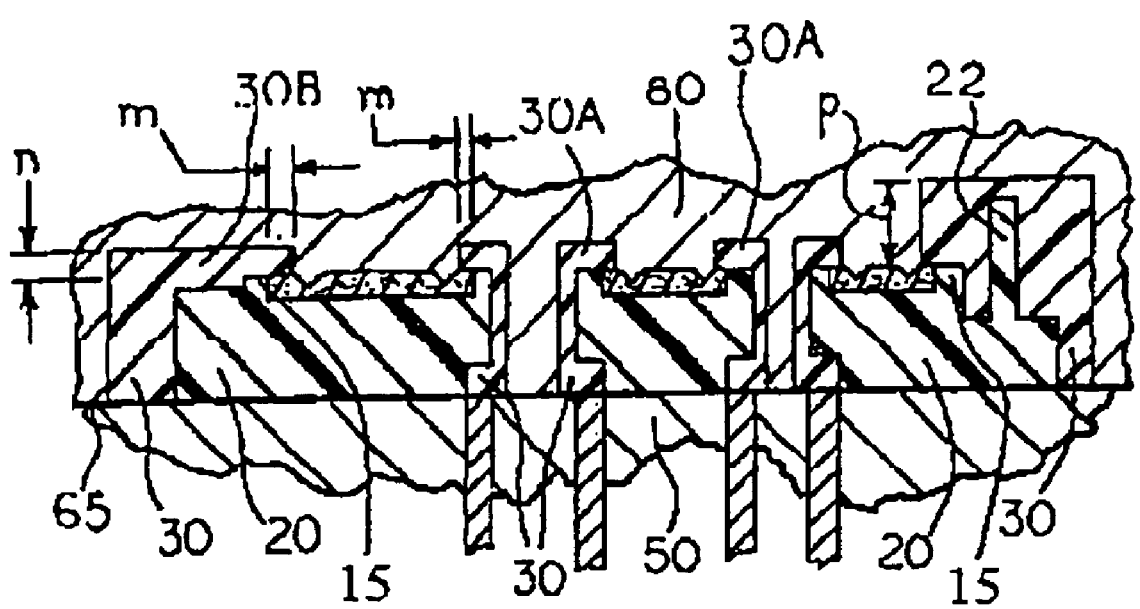
FIG. 5 is a cross sectional view of the second component molding step.

FIG. 5 is a cross sectional view of the mold configuration during the second molding step and after injection of the second substrate component plastic material. As can be seen, the second component material (30) has been injected, filled all of the flow channels and, where shown as 30A, covered and secured the sheet material at the peripheral edge areas and, where shown as 30B, covered and secured the sheet material at the interior edge areas.

The plastic articles according to the present invention can be prepared using known multi-component molding techniques. A preferred multi-component molding technique (also referred to as two-shot injection molding) is usually accomplished by preparing a first molded component ("first shot") having an adhered or laminated sheet material surface piece between at least two mold parts (usually referred to as a "core" and a "cavity"), leaving the molded first component or intermediate in (or on) one of the mold parts (the "first mold part") and then either (a) moving in at least one different mold part, (b) moving the first mold part to a position opposing a different mold part, or (c) the use of sliding or movable section in the mold to provide a further cavity. In this way a second cavity is formed corresponding to the desired molded-on, edge-covering component, and filled with the desired plastic material.

An alternative multi-component molding technique (also referred to as insert injection molding) is usually accomplished by initially molding a first molded component or intermediate ("first shot") having an adhered or laminated sheet material surface piece in one set of mold parts, removing this intermediate component part and transferring it to a second set of mold parts for injection molding the second component. The second mold is designed is such a way that it comes in contact with the first molded component as needed to form a cavity corresponding to the desired molded-on, edge-covering component.

Plastic Substrate Component with Adhered Sheet Material

As mentioned above, this first or substrate component can be prepared by generally known molding techniques that are suited to provide the necessary plastic substrate or base part having the sheet material surface piece properly located and sufficiently adhered. A preferred molding technique is injection molding by preparing pre-cut sheet material piece that can be properly located and sufficiently fixed to an inner mold surface in an injection molding mold during the injection molding process. In the injection molding step molten plastic is injected into the mold, filling the mold, conforming the sheet material piece to the mold shape and simultaneously laminating or bonding the sheet material piece to the plastic. As discussed above, the sheet material piece has an adhesive and has a backing layer that protects the adhesive and facilitates the step or process of adhesion/lamination to the substrate component. Other suitable processes for forming the substrate and/or attaching the sheet material include compression molding, radio frequency (RF) welding, sonic welding, thermoforming, injection compression molding, gas assist injection molding, structural foam injection molding, microcellular foam molding technology, laminar injection molding, water injection molding, external gas molding, shear controlled orientation molding, and gas counter pressure injection molding.

Thermosetting or thermosetable plastics can also be employed to similarly prepare the sheet material-laminated plastic substrate component using known techniques for reaction injection molding or resin transfer molding.

If appropriate, the mold surface of any of the mold parts can be textured to any known surface finish that is desired for either the exposed portion of the sheet material surface piece (depending upon the type of sheet material being used), the appearance or texture of the exposed portions of the plastic material or provide a desired surface for subsequently attaching or affixing either the sheet material surface piece or molded-on edge-covering component. Then, during the injection step the plastic enters the mold, filling the mold, conforming the sheet material piece to the mold shape and imparting the mold surface/grain/texture onto the sheet material or substrate material surface.

In general, the first substrate component can be prepared from a broad range of plastic materials including thermoset plastics such as polyurethane, epoxy or thermosetting silicone and thermoplastics such as polycarbonates ("PC"), ABS, polypropylene ("PP"), high impact polystyrene ("HIPS"), polyethylene ("PE"), polyester, polyacetyl, thermoplastic elastomers, thermoplastic polyurethanes ("TPU"), nylon, ionomer (e.g., Surlyn), polyvinyl chloride ("PVC") and including blends of two or more of these thermoplastics such as PC and ABS. These materials may contain pigments, additives and/or fillers that contribute any needed cost and/or performance features such as surface appearance, ignition resistance, modulus, toughness, EMI shielding and the like. The plastic material of the first plastic substrate component may be the same as or different than that used in the second, edge-covering component and hence may or may not be readily identifiable or distinguishable from that of the second component after the final molded article is prepared. This depends upon whether there is a detectable boundary between the two plastic materials.

Molded-On Edge-Covering Component

In general, like the first substrate component, the molded-on edge-covering component, applicable, can be prepared from a broad range of plastic materials including thermoset plastics such as polyurethane, epoxy or thermosetting silicone and thermoplastics such as polycarbonates ("PC"), ABS, polypropylene ("PP"), high impact polystyrene ("HIPS"), polyethylene ("PE"), polyester, polyacetyl, thermoplastic elastomers, thermoplastic polyurethanes ("TPU"), nylon, ionomers (e.g., Surlyn), polyvinyl chloride ("PVC") and including blends of two or more of these thermoplastics such as PC and ABS. These materials may contain pigments, additives and/or fillers that contribute any needed cost and/or performance features such as surface appearance, ignition resistance, modulus, toughness, EMI shielding and the like. Selection of the second component material is dependent on obtaining the desired adhesion to the first component and sheet material combined with desired processability and finished part appearance and performance.

In general, the dimensions of the molded-on edge-covering component (shown as example dimensions m, n and p in FIG. 5) will depend on the molded part design and degree of precision and accuracy with which the sheet material piece can be cut and then be located on the first component. A longer average overlapping dimension, shown as dimension m in FIG. 5 (i.e., overlapping a larger sheet material area adjacent the edges), may be needed in order to compensate for (and more consistently provide perfect edges if there is) greater variability in the sheet material piece dimensions, cutting irregularities in the sheet material edges and/or variability in location of the sheet material piece in the mold. In general, for most sheet material types and molded part designs, the average overlapping distance needs to be at least 0.1 millimeters (mm), preferably at least 0.2 mm, more preferably at least 0.3 mm and most preferably at least 0.5 mm. It should also be noted that varying and/or significantly greater overlapping distances may be employed for certain desired part aesthetics such as logos molded onto the edge of the sheet material surface or the like. In such cases the overlapping distances of such aesthetics surfaces would obviously not be used to "calculate" an average overlap distance, only the designed or target overlap distance for the overlapping areas where edge-covering alone was the goal.

The thickness of the overlapping layer of the edge-covering component (shown as example dimensions n and p in FIG. 5) is determined by the desired dimensions (e.g., "thinness") and overall design of the finished part. Where a thicker overlapping layer is desired, this can be affected by the ability to provide the proper dimensions for a larger volume flow leader since the volume of the flow leader cavity or channel will generally need to be greater than the volume of the edge-covering cavity (which cavity provides the overlap distance and thickness of the component). In general, for most sheet material types and molded part designs, the average edge-covering layer thickness needs to be at least 0.2 millimeters (mm), preferably at least 0.3 mm, more preferably at least 0.5 mm and most preferably at least 0.7 mm. It should also be noted that varying and/or significantly greater thickness may be employed for the edge-covering component for certain desired part aesthetics such as molded-on logos or the like. As with the overlap distances discussed above, in such cases the thickness of such aesthetic surfaces would obviously not be used to "calculate" an average thickness, only the designed or target thickness for the overlapping layer areas where edge-covering alone was the goal.

The second or edge-covering component is provided or applied in a molding process (as opposed to use of adhesives or fasteners) to the first molded component (having a sheet material surface piece sufficiently adhered or laminated) with a thermoplastic melt bonding at the desired surface location. Suitable molding processes for producing the finished part according to this invention include injection molding, compression molding, reaction injection molding ("RIM"), radio frequency (RF) welding, sonic welding, thermoforming, injection compression molding, gas assist injection molding, structural foam injection molding, microcellular foam molding technology, laminar injection molding, water injection molding, external gas molding, shear controlled orientation molding, and gas counter pressure injection molding. It is preferably provided as the second injection or shot in a "two shot" molding process or injection molded as the second step in an insert injection process, as are both described above. In providing the second component as the second injection or shot in a "two shot" molding process, the first component with adhered sheet material piece is retained in or on one of the mold parts and a cavity for the second shot is then provided by either (a) moving in at least one different mold part, (b) moving the first mold part to a position opposing a different mold part, or (c) the use of sliding or movable section in the mold to provide a farther cavity.

Alternatively, the insert injection molding process, the first molded component having an adhered or laminated sheet material surface piece is prepared in one set of mold parts, removed, and transferred to a second mold for injection molding the second component. The second mold is designed in such a way that it comes in contact with the first molded component as needed and forms a cavity corresponding to the desired molded-on, edge-covering component.

In either of these situations where the second component is added in an injection molding step in commercially desirable high injection rates and pressures, the first component, the molds and the tooling to add the second component have to be designed to reduce or eliminate "stripping" and "tunneling". "Stripping" is the tendency of the molten resin to penetrate under the sheet material edge and for the sheet material then to be separated from the first component during this molding step, particularly when second shot material flows parallel to the sheet material edge and, when flowing at a sufficiently high rate, contacts the edge/interface. "Tunneling" is when the flowing resin lifts the sheet material off from the first molded substrate and/or separates/delaminates the sheet material itself and "tunnels" under or through the sheet material when the flow front contacts a thick and/or unsupported area of the sheet material edge that extends substantially into the flow front of the second shot material, particularly when the sheet material edge is contacted in a mostly perpendicular direction. Some sheet material materials aggravate this problem when they expand in thickness after removing the first mold cavity after forming the first component and or expand in length under compression in the second molding step. This expansion may cause the sheet material to extend (unsupported) into the flow channel for the second molding. It helps somewhat in avoiding these types of problems if the edge of the sheet material that has been inserted into the mold prior to molding the substrate component does not reach the edge of the mold and plastic from the substrate component then forms the outermost edge of the intermediate part before the edge covering component is molded on.

Therefore, when injected into the mold cavity, the flow of second component plastic material needs to be properly directed and controlled so that it flows over and covers the peripheral and/or interior edges of the sheet material at the boundary or interface area between the sheet material and the first component. The injection rate and pressure for the second component obviously need to be optimized and as high as possible to provide the proper combinations of mold filling, part aesthetics and molding cycle time. Simultaneously, the sheet material surface piece has to be properly sized, cut and located relative to the second material flow front to further avoid these problems.

To help reduce or eliminate these situations in a second injection molding step, novel mold and part designs and combinations of designs were developed to reduce the likelihood of plastic material flowing parallel at a high rate over the sheet material edge/interface or close to it. Normal thermoplastic part design requires that the nominal thickness of the part or part wall to be generally uniform. This is done to produce uniform plastic material filling throughout the part. Otherwise, the molten injected plastic will preferentially flow into the larger sections where there is less resistance to the flow. In contrast, the part/mold design developed and preferably used according to the present invention uses a non-uniform wall thickness to provide a larger cross-sectional flow area that serves as a "flow leader" or provides a flow leader effect. A flow leader channel is shown as channel 83 in FIG. 4 (with dimensions X and Y) along with correspondingly smaller cross-sectional flow areas at the sheet material edges (referred to as sheet material edge cavities and shown as channel 82 with dimensions X' and Y' in FIG. 4). The flow leaders or the flow leader effects are designed and provided in such a way that the second shot material flows initially from the gate into the cavity and tends to flow preferentially along and through the main flow channel or flow leader and does not initially enter the sheet material edge cavity section. In this way the main flow front of the injected molten plastic flows parallel to but removed from the sheet material edge/interface to fill a large portion of the cavity volume. The plastic does not initially flow into the sheet material edge cavity area or over or in contact with the sheet material edge/interface but fills more gradually and/or at a non-parallel angle into the lower volume sheet material edge cavity section, covering the sheet material edges with less parallel flow shear force. Preferably, this flow is directed over the edge/interface at a reduced rate and/or in a non-parallel orientation closer to perpendicular to the edge, preferably between 20 degrees and 90 degrees relative to the interface. This reduces or eliminates the problems of sheet material stripping, tunneling or other dislocation or removal due to parallel and/or high rate flow over the interface. If using a flow leader channel, the cross-sectional area of the of the flow leader needs to be at least 10% greater than the cross-sectional area of the cavity area that is providing the edge-covering component over the sheet material edge areas in order to obtain these benefits and reduce sheet material "stripping".

Another way to effectively provide a flow leader effect is to create a "flow restrictor" that narrows and restricts the flow path of the molten resin as it goes to the area of the sheet material edges (peripheral or internal) from the main flow channel. Preferably the flow restrictor is provided by the first molded substrate component as a molded-in or molded-on rib or profile at the appropriate location, as shown in FIGS. 3, 4 and 5, identified as feature (22). The flow restrictor technique is especially beneficial when using a sheet material that expands after the molding of the first component and the removal/change of the first mold cavity. Upon its expansion, the sheet material edges may not be well adhered to the first component and/or be loose at some points. The flow restrictor then creates a flow leader effect and guides the second molding material initially along the channel (shown as 83' in FIG. 4) and then into the edge cavity area (shown as 82' in FIG. 4) and onto the top of the sheet material in a more perpendicular direction. The flow restrictor should be located close to the sheet material edge/interface, typically within about 4 millimeters (mm). The height of the flow restrictor relative to the sheet material in the sheet material edge cavity needs to be sufficient that the sheet material is protected from the flow and shear as the main body of molten plastic flows in the flow leader or main flow channel area of the cavity (83' in FIG. 4) in a generally parallel direction. In this way the plastic flow forces in the sheet material edge cavity (82' in FIG. 4) will not separate or delaminate the sheet material from the substrate and/or internally delaminate the sheet material itself. Typically the flow restrictor needs to be high enough to sufficiently divert molten plastic flow over the sheet material edge, preferably the restrictor is higher than the height of the sheet material in the sheet material edge area of the cavity.

Another way to eliminate the sheet material from being stripped from the first molding is to incorporate a cavity design that directs the flow of the injected second material generally perpendicularly off of an "impingement" surface on the mold and onto the sheet material surface at the sheet material periphery (as opposed to flowing against and onto the sheet material in a generally co-planar direction). This design uses a flow channel/cavity having at least one sharp angle in the flow path to cause the injected, molten second material to contact the mold wall opposite the sheet material surface (i.e., the impingement surface) before contacting the sheet material surface and subsequently flowing over the sheet material edge in a fashion that does not force or tear it away from the first substrate part. This is shown in FIGS. 4 and 5 where the mold impingement surfaces are identified as (23).

The use of multi-component molding requires that a second mold cavity come in contact with the front aesthetic surface of the sheet material prior to and during the molding of the second component. In molding the second component, proper measures are needed to avoid problems related to the destructive crushing of the sheet material surface texture as well a preventing the second material "flashing" or "tunneling" outside of the intended second cavity area. "Flashing" can result in forming layers or pieces of second plastic material that lie on the sheet material surface while "tunneling" allows plastic material to flow under the sheet material or through the sheet material itself. Both effects are problems and create a surface flaw on the sheet material surface when the part is removed from the mold. Special design techniques must be utilized which minimizes the aesthetic impact on the sheet material surface. In this regard, a second mold cavity surface should be designed that sufficiently compresses, preferably tightly pinches or crushes the sheet material surface area to a point that the second molding injection will not flash plastic material between the cavity/sheet material interface but without destructively crushing the sheet material. It has been found that this cavity surface preferably compresses or crushes the sheet material back to at least the thickness it had when compressed under molding pressure in the original cavity, depending upon the viscosity and injection pressure of the second molding material. Another preferred design technique to help minimize flashing or tunneling of this type is a so-called "crush rib", shown in FIGS. 4 and 5 as (81). In this embodiment of the invention, the second component mold cavity (80) should be designed such that there is a projection or rib in the area at or near the sheet material edge and going all the way around the edges of the sheet material surface where it is to be overlapped with the edge-covering component. Depending upon the nature of the sheet material, this rib will tightly pinch or crush the sheet material to a point that the second molding injection cannot flash plastic material between the cavity/sheet material interface and may reduce the degree to which the rest of the sheet material surface needs to be compressed or crushed. This crush rib is shown in FIGS. 4 and 5 identified as (81). The second cavity "crush rib" should not cut the sheet material but should depress or crush the sheet material sufficiently, depending upon the nature of the system components such as the sheet material, first and second molding materials and second molding conditions. Preferably the crush rib depresses the sheet material nearly to the surface of the underlying substrate plastic.

In another embodiment of the present invention where the second edge-covering component will need to cover sheet material edges around multiple openings in the sheet material-covered surface of the part and it is desired to minimize the injection ports or gates in the mold parts, the flow channels for delivery of the second plastic material to all or part of those sheet material edges around the openings are preferably located in the first substrate component, in the back surface or the side opposite the sheet material-surfaced side. This is particularly advantageous in that the flow of the second material through these channels can then very readily be directed against impingement surfaces and onto the sheet material edges as it is directed outwardly from behind the plane of the sheet material surface. Molded-in flow channels are shown in FIGS. 4 and 5 and identified as (84).

In alternative embodiments, the second edge-covering component can be provided onto the first component and sheet material edges using other known techniques. Using a compression molding process the sheet material piece edges can be covered by creating a cavity and providing a thermoset or thermoplastic material. Thermosetting or thermosetable plastics can also be employed to similarly prepare the second edge-covering component using known techniques for reaction injection molding. Using a sonic welding process the second component is molded on by heating the contact surfaces or areas using ultrasonic energy. An edge-covering component can be molded on in a thermoforming process by placing sheet material in the thermoforming mold and heating a plastic sheet to a melting and forming temperature then subsequently forming the plastic sheet over the inserted sheet material.

EXAMPLE 1

A part according to the present invention as shown in FIG. 1 was designed and produced generally as discussed above. The sheet material is an aluminum sheet that is about 0.05 millimeter thick and it has an adhesive layer of copolyamide based adhesive film (about 50 grams per square meter) and a backing that is an ABS film that is about 0.18 millimeter thick. The aluminum and the adhesive and backing layers are bonded together by thermal lamination in a flat bed type laminator with heating plates at set points of about 120 degrees C. and providing observable bonding of the layers. The resulting laminate was pre-cut to the desired size and shape for the insertion into the mold cavity and such that the aluminum sheet material does not reach the ends or edges of the empty mold cavity and a gap of about 0.75 mm is left for the first injected resin to flow over and abut the peripheral edges of the aluminum sheet material. The precut piece is inserted into the desired location between the cavity and the core on an injection mold. The aluminum sheet surface that is intended to be the visible, outer surface of the part is placed against the cavity and held in place with single sided adhesive tape. The first injection molded material, PC/ABS blend is injected into the mold coming in contact with the ABS film backing. The flow of the injection molded thermoplastic, PC/ABS blend provides pressure to the back side of the aluminum sheet, sufficient to form the aluminum sheet to the shape of the cavity surface including any desired graphic effect such as an embossed logo or the like. The PC/ABS blend thermoplastic adheres to the ABS film that is on the back side of the aluminum sheet and this step provides a plastic substrate component having an adhered aluminum sheet piece forming a part of the surface area of the part and having peripheral edges essentially embedded in the injected plastic.

The injection mold is then opened leaving the first injection molded component on the core side of the injection mold. The core side for the injection mold is then rotated to a second position. A second injection mold cavity closes onto the first injection molded component and provides a mold cavity that will provide an overmolded edge covering. The closed mold has surfaces that both (a) contact and compress the aluminum sheet surface area so that the aluminum sheet surface is compressed between the mold cavity and core and (b) leave the aluminum sheet edges exposed in the cavity for the flow and molding of the edge-covering component.

For forming the edge covering component without the problems caused by the high pressure and shear flow of the injected resin directly against the peripheral edges of the aluminum sheet, the second mold is designed to have a flow leader cavity and a smaller volume edge cavity as shown in FIG. 2 and on the left side of the molding configuration in FIG. 4 going completely around the peripheral aluminum sheet edges. For the edge-covering component that is overlapping the edge of the aluminum sheet, the targeted overlapping distances varied for the edge, averaging about 2 millimeters. The targeted thickness of the overlapping layer also varied for the edge and averaged about 1 millimeter.

The second thermoplastic, TPU, is injected into the mold covering and sealing the aluminum sheet edge area. When the part is removed from the mold, there is an attractive finished part with a well secured and sealed aluminum surface area. The edge cover area having a TPU surface layer has a desirable soft touch feel.

When removed from the mold, bonding of the sheet metal material is tested by placing the finished piece into a controlled environment chamber. The temperature within the chamber is then varied from −40 C. to 80 C. as rapidly as possible. After 200 cycles from −40 to 80 C., the samples are removed and inspected.

The surface appearance and edge covering are observed and determined to be acceptable, displaying no apparent separation or delamination of the aluminum sheet material from the substrate, no surface blisters nor surface defects.

The adhesion of the aluminum sheet was also evaluated using a 90 degree peel test procedure. The peel adhesion test samples were prepared as follows. In order to prevent complete adhesion of the injected plastic substrate to the aluminum laminate sheet and provide a small tab that could be peel back and attached to the peel testing apparatus, the backing side of the sheet laminate (aluminum/adhesive/ABS film) was taped on one edge for about 1 inch (25.4 mm) in width. The aluminum laminate was placed in the mold and plastic material was injected on the laminate. The test specimen was removed from the mold and cut to give specimens that were 1 inch wide by 5 inches long. These test specimens then resembled a specimen obtained according to ASTM D-429 method B. The aluminum edge was peeled back from the taped area and pulled apart from the fixed plastic substrate at a 90 degree on a movable table according to ASTM D429 method B. An Instron equipped with MTS software was used. A movable fixture was used to allow the sample to be pulled always at a 90 degree angle. The force required to pull the materials apart, or to break the laminate was recorded in pounds/linear inch.

These results are summarized in the following table. This shows that injection molded plastic parts having a plastic substrate and a surface area of an aluminum sheet are prepared according to the invention where the aluminum sheet is uniformly conformed and adhered to the plastic substrate and the edges are secured in a very effective and aesthetically pleasing manner. Parts are produced with good appearance, precise dimensions, thin part cross section and stable, secure edge coverings. In initial experiments it was found that if the adhesive was directly exposed to injection molded polymer melt without the protective backing (ABS film), it resulted in poor bonding and de-lamination due to degradation and/or displacement of adhesive.

| Sheet Material | | | Substrate | Bonding performance |
|---|---|---|---|---|
| Metal | Adhesive | Backing | | |
| Aluminum 0.002" | copolyamide based adhesive | ABS | PC/ABS | 90 Degree Peel Testing Peel strength greater than 5 lbs |
| Aluminum 0.002" | copolyamide based adhesive | No backing | PC/ABS | wrinkles, delamination |

EXAMPLE 2

A part according to the present invention as shown in FIG. 1 was designed and produced generally as shown in FIGS. 1 through 5 and discussed above. The sheet material is a wood veneer having a thickness of about 0.5 millimeters, with the copolyamide based adhesive according to Example 1 and backed with 0.18 millimeter thick ABS film, bonded together by thermal lamination as described in Example 1. The resulting laminate was pre-cut to the desired size and shape such that the wood veneer does not reach the ends or edges of the empty mold cavity when it is inserted into the desired location between the cavity and the core on an injection mold leaving a gap of about 0.75 mm to be filled by the plastic substrate material. The external surface of the wood veneer is placed against the cavity and held in place with single sided adhesive tape. The first injection molded material, PC/ABS blend is injected into the mold coming in contact with the ABS film backing. The flow of the injection molded thermoplastic, PC/ABS blend, provides pressure to the back side of the wood veneer, sufficient to form the wood veneer to the shape of the cavity surface and provide an embossed logo area. The PC/ABS blend thermoplastic adheres to the ABS film that is on the back side of the wood veneer and this step provides a substrate component having an adhered wood veneer piece having peripheral edges and a surface area.

The injection mold is then opened leaving the first injection molded component on the core side of the injection mold. The core side for the injection mold is then rotated to a second position. A second injection mold cavity closes onto the first injection molded component and provides a mold cavity. The closed mold has surfaces that both (a) contact and compress the wood veneer surface area so that the surface is compressed between the mold cavity and core and (b) leave the wood edges exposed in the cavity for the flow and molding of the edge-covering component.

The second mold is designed to have a flow leader cavity and a smaller volume edge cavity as shown by (83) on the left side of the molding configuration in FIG. 4 going completely around the peripheral wood veneer edges. The upward flow from channel (83) directs the second component material flow against the surfaces of the second mold cavity and generally onto the top of the wood veneer and edges from a direction generally perpendicular to the plane of the wood veneer. This flow of the edge-covering material over the wood veneer edges in this fashion minimizes or eliminates the wood veneer stripping in those sections of the wood veneer edge. For the edge-covering component that is overlapping the edge of the wood veneer, the targeted overlapping distances varied for the edge, averaging about 2 millimeters. The targeted thickness of the overlapping layer also varied for the edge and averaged about 1 millimeter.

A second thermoplastic, TPU, is injected into the mold covering and sealing the wood veneer edge area. When the part is removed from the mold, there is an attractive finished part with a well secured and sealed wood veneer surface area. The edge cover area having a TPU surface layer has a desirable soft touch feel.

When removed from the mold, bonding of the sheet metal material is tested by placing the finished piece into a controlled environment chamber. The temperature within the chamber is then varied from −40 C. to 80 C. as rapidly as possible. After 200 cycles from −40 to 80 C., the samples are removed and inspected.

The surface appearance and edge covering are observed and determined to be acceptable, displaying no apparent separation or delamination of the wood veneer material from the substrate, no surface blisters nor surface defects.

The adhesion of the wood veneer was also evaluated using a 90 degree peel test procedure. The peel adhesion test samples were prepared as follows. In order to prevent complete adhesion of the injected plastic substrate to the veneer sheet and provide a small tab that could be peel back and attached to the peel testing apparatus, the backing side of the sheet laminate (wood/adhesive/ABS film) was taped on one edge for about 1 inch (25.4 mm) in width. The wood laminate was placed in the mold and plastic material was injected on the laminate. The test specimen was removed from the mold and cut to give specimens that were 1 inch wide by 5 inches long. These test specimens then resembled a specimen obtained according to ASTM D-429 method B. The veneer edge was peeled back from the taped area and pulled apart from the fixed plastic substrate at a 90 degree on a movable table according to ASTM D429 method B. An Instron equipped with MTS software was used. A movable fixture was used to allow the sample to be pulled always at a 90 degree angle. The force required to pull the materials apart, or to break the laminate was recorded in pounds/linear inch.

These results are summarized in the following table. This shows that injection molded plastic parts having a plastic substrate and a surface area of a wood veneer material are prepared according to the invention where the wood veneer sheet material is uniformly conformed and adhered to the plastic substrate and the edges are secured in a very effective and aesthetically pleasing manner. Parts are produced with good appearance, precise dimensions, thin part cross section and stable, secure edge coverings.

| Sheet Material | | | Substrate | Bonding performance |
|---|---|---|---|---|
| Surface | Adhesive | Backing | Substrate | 90 Degree Peel Test |
| Wood veneer | copolyamide based adhesive | ABS | PC/ABS | Peel strength greater than 5 lbs |

What is claimed is:

1. A process for preparing a molded plastic article having a sheet material surface piece comprising the steps of: (a) providing a precut thin, semi-rigid sheet material surface piece selected from the group consisting of: metal, wood and wood-based paper products to a mold cavity: (b) molding in a first molding step a substrate plastic component having adhered to a surface thereof the sheet material piece having edges and a surface area; and (c) molding onto the substrate plastic component in a second molding step an edge-covering component which overlaps at least part of the sheet material edges and sheet material surface area adjacent the edges but not covering an area of the adhered sheet material surface piece that provides a part of the article surface.

2. A process according to claim 1 where, in the first molding step, the precut sheet material surface piece is adhered in the molding step to a continuous plastic substrate and the adhered sheet material surface piece is provided with an edge thickness covering that will cover at least a part of the thicknesses of the peripheral edges of the sheet material.

3. A process according to claim 1 where the molded-on edge-covering component is provided directly to the substrate plastic component with adhered sheet material that results from the first molding step without intermediate trimming, cutting or tooling.

4. A process according to claim 1 wherein the sheet material is a laminate structure comprising the sheet material, an interior adhesive layer and, on the surface opposite the sheet material layer, a protective backing layer which bonds or otherwise adheres to the substrate plastic and protects the adhesive layer during the molding step.

5. A process according to claim 1 where the second molding step uses a flow leader effect with (a) a main flow leader cavity for the edge-covering plastic component material which main flow cavity is generally around and outside the area of the peripheral sheet material edges and (b) a sheet material edge cavity that receives a flow of the edge-covering material in a direction that is generally not parallel to the peripheral edges of the sheet material.

6. A process according to claim 1 where, in the first molding step, the substrate plastic completely covers the back side of the sheet material piece.

7. A process according to claim 6 where, in the first molding step, the precut sheet material is slightly smaller than the cavity and the substrate plastic provides a protective edge thickness covering that covers at least a part of the thicknesses of the peripheral edges of the sheet material.

8. A process according to claim 1 wherein the adhered sheet material surface piece is a thin metal sheet or foil.

9. A process according to claim 8 wherein the adhered sheet material surface piece is a thin stainless steel foil.

10. A process according to claim 8 wherein the adhered thin metal sheet or foil has a thickness in the range of from about 0.01 mm to about 6.0 mm.

11. A process according to claim 8 wherein the adhered thin metal sheet or foil has a thickness of less than 2.0 mm.

12. A process according to claim 1 wherein the adhered sheet material surface piece is a coated metal foil or sheet.

13. A process according to claim 12 wherein the adhered sheet material surface piece is a coated stainless steel foil.

14. A process according to claim 13 wherein the stainless steel foil has a thickness less than 2.0 mm.

15. A process according to claim 1 wherein the sheet material is a laminate structure comprising the sheet material, an interior adhesive layer and, on the surface opposite the sheet material layer, a protective backing layer which bonds or otherwise adheres to the substrate plastic and protects the adhesive layer during the molding step.

* * * * *